United States Patent [19]

Milster et al.

[11] Patent Number: 4,823,220

[45] Date of Patent: Apr. 18, 1989

[54] DETECTOR FOR MAGNETOOPTIC RECORDERS

[75] Inventors: Thomas D. Milster; Shingshwang Yao, both of Tucson, Ariz.

[73] Assignee: International Business Machines Corporation, Armonk, N.Y.

[21] Appl. No.: 121,209

[22] Filed: Nov. 16, 1987

[51] Int. Cl.$^4$ .............................................. G11B 5/127
[52] U.S. Cl. ................................... 369/13; 350/404; 369/110
[58] Field of Search .............. 360/114; 369/13, 44–46, 369/106, 109, 110; 350/400–405; 358/128; 365/121–122

[56] References Cited

U.S. PATENT DOCUMENTS

| | | | |
|---|---|---|---|
| 4,100,577 | 7/1978 | Naruse et al. | 358/128 |
| 4,136,362 | 1/1979 | Naruse et al. | 358/128 |
| 4,451,863 | 5/1984 | Yanagida et al. | 360/114 |
| 4,609,961 | 9/1986 | Jacobs | 360/114 |

FOREIGN PATENT DOCUMENTS 58-97141  6/1983  Japan .
59-124044 7/1984  Japan .

OTHER PUBLICATIONS

Treves et al., "Signal, Noise, and Codes in Optical Memories", Optical Engineering; vol. 25, No. 7; Jul., 1986; pp. 881–889.

Primary Examiner—A. J. Heinz
Attorney, Agent, or Firm—H. F. Somermeyer

[57] ABSTRACT

A modulated light beam, as received from a magnetooptic record medium, carries information in the form of linear polarization rotations having P and S components, herein also referred to as light-phase modulated light. A phase-to-intensity converter optically rotates one of the component linear polarization to be aligned with the linear polarization of the other component. The rotated component and the other component are then combined along a common optical path for interferometrically generating a single intensity-modulated light beam. The intensity-modulated light beam is then detected with an output electrical signal indicative of the information carried by the P and S components. In one form, the phase-to-intensity converter includes generating two intensity-modulated light beams using interferometric techniques, separately detecting the intensity modulator light beams and combining same electrically in a differential amplifier.

15 Claims, 1 Drawing Sheet

DETECTOR FOR MAGNETOOPTIC RECORDERS

FIELD OF THE INVENTION

The present invention relates to optical systems, particularly those systems for detecting informational content of light beams carrying information in the form of polarization rotation in P and S components.

DISCUSSION OF THE PRIOR ART

It is well known that light beams can carry information through intensity modulation of the beam or through modulation of the linear polarization of the beam, which results in P and S components of polarization. A known example of such light beams carrying information in the manner just described are optical data recorders. All of such data recorders, except for the magnetooptic recorders, use intensity modulation for carrying information from a disk to a detector or from a recording optical element to the disk. In magnetooptic recorders, the recording light beam is intensity modulated whereas the read light beam has its linear polarization modulated (herein also referred to as light-phase modulated) by the recorded information through rotation of its linear polarization creating modulated P and S components. Typical magnetooptic signal detectors separate the P and S components and supply the separated components to two separate optical detectors. The electrical output signals from the two optical detectors are then supplied to a differential amplifier which then in turn supplies a resultant differential signal indicative of the information recorded on the magnetooptic record medium, usually a rotating disk.

Yanagida et al., U.S. Pat. No. 4,451,863 shows a typical arrangement for detecting the modulated signal received from a magnetooptic record disk. Other examples of separation of the P and S components for diverse purposes are shown by Naruse et al., in U.S. Pat. No. 4,100,577; by Naruse et al., in U.S. Pat. No. 4,136,362 and in the Japanese patent publications 58-97141 and 59-124044. A general background on signal, noise, and codes in optical memories is given by Treves and Bloomberg in the periodical "OPTICAL ENGINEERING", July, 1986, Vol. 25 No. 7 in pages 881 through 891. This article describes rotation of the linear polarization of a reading light beam in magnetooptic recorders. In FIG. 3, this article shows the typical differential detector with two photodetectors. This prior art detection system has certain critical aspects and noise elements, including those set forth in the referenced article. Alignment of the optical path becomes complex and critical. Electrical differential compare circuits can reduce common mode noise; however, the electrical amplifiers are usually never precisely balanced resulting in an effective loss of signal amplitudes. It should also be noted that a relatively large number of optical components are necessary, which adds to the cost and complexity of a mechanism for detecting the P and S components of a modulated light beam. Accordingly, it is desired to have a simpler and potentially lower cost mechanism for detecting signals from a light beam modulated through rotation of its linear polarizations.

SUMMARY OF THE INVENTION

A light beam modulated through rotation of its linear polarization, resulting in P and S components, is optically converted from the light-phase modulated form to an intensity-modulated optical beam. One or two optical detectors then detect the intensity-modulated beam for supplying an electrical signal indicative of the information carried in the original light-phase modulated light beam. In a preferred form of the invention, interferometer techniques are applied for creating the intensity-modulated beam from the phase or linear polarization rotation modulated beam. In the most preferred form the change from phase modulation to intensity modulation is by an optical convertor which rotates one of the P or S components to be aligned with the other component. The rotated one component and the other component are then combined in a common light path for causing interference of the two light beams to create an intensity-modulated beam. Typically, one of the components has a much higher intensity than the other component. A neutral density filter may be used to reduce the larger intensity component intensity. The foregoing and other objects, features, and advantages of the invention will be apparent from the following more particular description of preferred embodiments of the invention, as illustrated in the accompanying drawings.

DETAILED DESCRIPTION OF THE DRAWING

Figure 1:
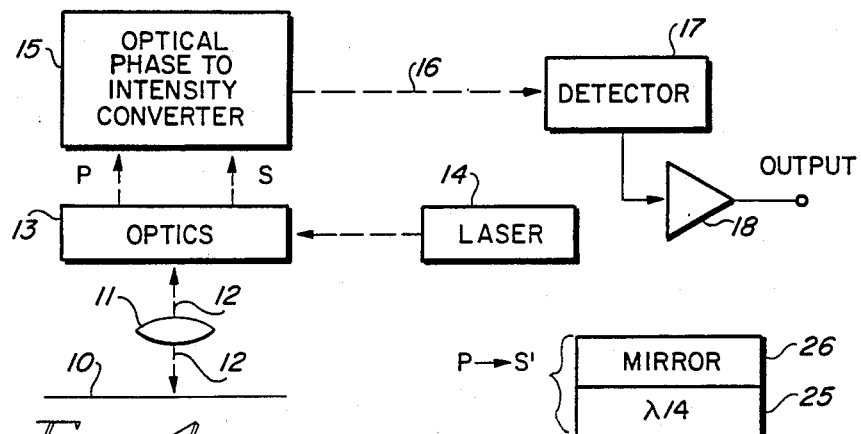
FIG. 1 is a simplified diagram illustrating a magnetooptic recorder employing the present invention.
Figure 2:
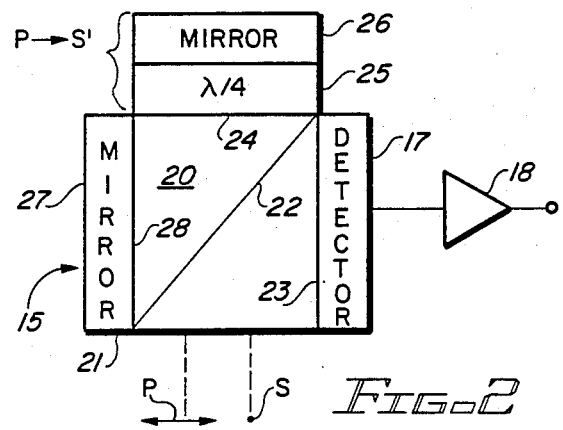
FIG. 2 is a first preferred embodiment of the phase to intensity convertor used in the FIG. 1-illustrated recorder.
Figure 3:
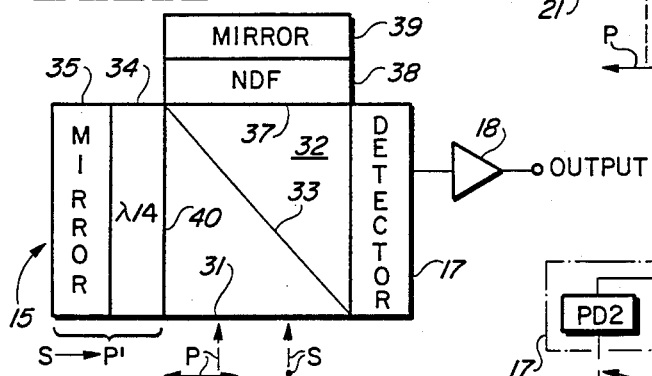
FIG. 3 is a second preferred embodiment of a phase to intensity convertor as usable in the FIG. 1-illustrated recorder.
Figure 4:
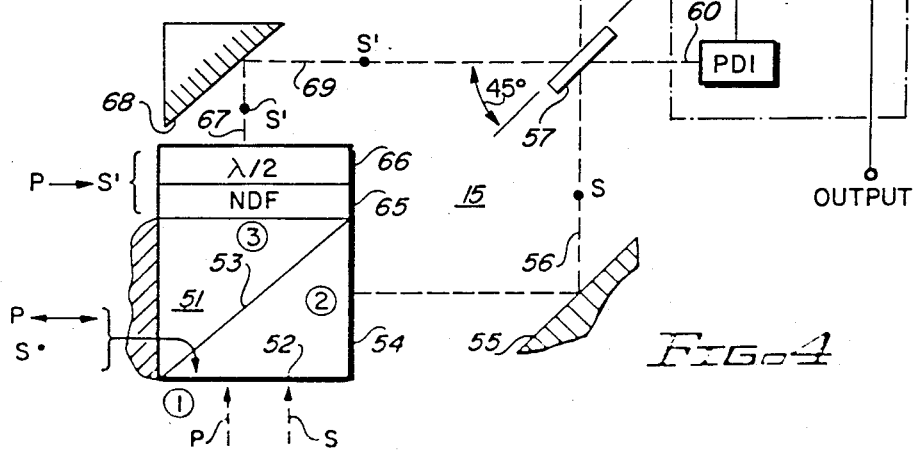
FIG. 4 is a third preferred embodiment of the phase to intensity convertor usable in the FIG. 1-illustrated recorder.

Referring now to the drawing, like numerals indicate like parts and structural features in the various figures. A magnetooptic medium 10, such as a rotating optical disk, has information recorded thereon, as is well known. The recorded information is sensed through objective lens 11 which focuses a read light beam 12 onto record disk 10. The reflected light is modulated by the recorded information on the record disk in the form of phase or linear rotation of the P and S components of the light beam. Optical system 13, which is constructed using known techniques, supplying the P and S components to an optical phase to intensity convertor 15, as shown in FIGS. 2 through 4. A laser 14 supplies monochromatic light through optics 13 for generating light beam 12. The optical phase to intensity convertor 15 combines the P and S components for generating a single intensity-modulated light beam supplied over light path 16 to a single photodetector 17 which in turn supplies an electrical output signal through electrical amplifier 18. In one of the illustrated embodiments, detector 17 includes two separate photodetectors.

Referring now particularly to FIG. 2, a first embodiment of the optical phase to intensity convertor 15 is described. The P and S components are shown as respectively being in the plane of the drawing and perpendicular to the plane of the drawing. A polarization-sensitive beam splitter 20 (hereinafter "beam splitter") has an input surface 21 receiving the P and S components from optics 13. Beam splitter 20 includes a polarization-sensitive junction or layer 22 which reflects the S component to detector 17, which is suitably mounted upon a surface of or separately mounted to be in optical communication with beam splitter 20. The detector 17 mounting surface is orthogonal to the input surface 21. The P component passes through the junction 22 to an opposite face 24 of beam splitter 20. Suitably mounted on the opposite face 24, is a convertor for optically converting the P component to be optically and linearly aligned with the phase of the S component. The rotated P component is labelled S'. The P to S' convertor consists of a phase plate 25 mounted upon the opposite facing surface 24. In a constructed embodiment, the phase plate is a quarter-wave plate which converts the linearly polarized P component to circularly polarized light which is reflected by mirror 26 mounted on the outer facing surface of phase plate 25. The reflected light from mirror 26 retraverses the phase plate 25 causing a 90° rotation or phase shift of light reentering beam splitter 20 through the opposite face 24. Surface 22 then reflects part of S' to a second mirror 27 mounted on a facing surface 28 of beam splitter 20 that faces detector 17. Reflected S' light beam travels through junction 22 and is combined with the S component inside beam splitter 20 in the space between junction 22 and the orthogonal face 23 mounting detector 17. In this common space the S' light interferes with the S component light generating an intensity-modulated beam representative of the information originally carried by the P and S components of the modulated read light beam. Detector 17 detects the intensity modulation of the intensity-modulated beam for supplying an electrical signal to electrical amplifier 18 representative of the information recorded on magnetooptic medium or disk 10.

A second embodiment of the optical convertor 15 is shown in FIG. 3 in which a polarization-sensitive beam splitter 32 has an input surface 31 receiving the P and S components as described for FIG. 2. The junction 33 allows the P component to travel to the oppositely facing surface 37 wherein it passes through a neutral density filter (NDF) 38 and is reflected by mirror 39. The reflected light is then reflected by junction 33 to travel to single photodetector 17. On the other hand, the S component light entering through input surface 31 is reflected by junction 33 for travel to the S to P' convertor consisting of a phase plate 34 (a quarter-wave plate) and a mirror 35 mounted on the facing surface 40 of beam splitter 32 which faces detector 17. The light re-entering beam splitter 32 is P' and is a 90° rotated version of the S component, which then travels through junction 33 to enter the common space between junction 33 and detector 17. In this common space, the P' and P component light beams combine for inducing interference between the two light beams resulting in a single intensity-modulated light beam carrying the information recorded on magnetooptic medium 10. NDF 38 reduces the intensity of the P component to be about the intensity of the component P' resulting in higher quality interferometric action of the two light beams. Detector 17 again detects the intensity-modulated beam for supplying an electrical output signal carrying the recorded information.

Referring now to FIG. 4, a third embodiment of the phase to intensity convertor 15 is described. A polarization-sensitive beam splitter 51 has an input surface 52 optically receiving the P and S components from optics 13. The junction or surface 53 is arranged for reflecting the S component through orthogonal surface 54 to a first mirror 55. Mirror 55 reflects the S component to travel along a first intersecting light path 56 to an optical plate beam splitter 57 disposed at 45° with respect to the axis of intersecting light path 56. The P component, on the other hand, travels through the junction 53 to P to S' convertor consisting of a neutral density filter NDF 65 and a half-wave phase plate 66. The 90° rotated P component (herein labelled S') is output from phase plate 66 to light path 67. Its linear polarization is now aligned with the S component polarization. A second mirror 68 reflects the path 67 light beam to a second intersecting light path 69 which intersects the first intersecting light path 56 in the plate beam splitter 57. Paths 69 and 56 are orthogonal such that beam splitter 57 is also disposed at 45° with respect to the axis of light path 69. The S' and S light components are 50% transmitted and 50% reflected by beam splitter 57 (which preferably has a non-reflective coating) such that one-half of the total light is directed to photodetectors PD1 and PD2 respectively along paths 60 and 61. Light paths 60 and 61 each constitute a common light path means wherein the S' and S component light are in interferometric relationship for creating an intensity-modulated light beam in each of the paths 60 and 61, each of which carry the information recorded on medium 10. PD1 and PD2 detect respectively the two intensity-modulated light beams to supply their output electrical signals to differential amplifier 62, which in turn supplies the output signal which is identical to the output of single terminal transimpedance amplifier 18. It is preferred that either of mirrors 55 or 68 be made adjustable for ensuring preciseness in relationship of the two light beams to the plane of plate beam splitter 57. In a preferred constructed embodiment mirror 68 was made adjustable.

While the invention has been particularly shown and described with reference to its preferred embodiments thereof, it will be understood by those skilled in the art that various changes in form and details may be made therein without departing from the spirit and scope of the invention.

What is claimed is:

1. In apparatus for reproducing information carried in a modulated light beam wherein the modulation of the light beam consists of a plurality of linear light polarization rotations and having P and S components; the improvement including, in combination:
   first optical means for supplying the light beam having said P and S components subjected to polarization rotation for carrying information;
   a P and S component to intensity optical beam convertor means in optical communication with the first optical means for receiving the P and S modulated light beam having both said P and S components and converting same into an intensity-modulated light beam wherein the intensity modulation carries said information; and
   a photodetector means in optical communication with the convertor means for receiving the intensity-modulated beam and converting same into a modulated electrical signal carrying said information.

2. In the apparatus set forth in claim 1, further including, in combination:
   optical phase change means in said optical beam convertor means optically coupled to said first optical means for receiving one of said components and for optically phase changing the received one light component to the optical phase of a second of said components and output means in the optical beam convertor means optically coupled to the phase change means and to the first optical means for combining said phase changed one component and said other component into said intensity-modulated light beam.

3. In the apparatus set forth in claim 2, further including, in combination:
said output means including a common output light path which combines said phase changed one component and said other component creating light interference patterns which constitute said light intensity modulation.

4. In the apparatus set forth in claim 3, further including, in combination:
said optical beam convertor means including a polarization-sensitive beam splitter having an input surface in optical communication with said first optical means for receiving said components and operative to pass a given one of the component through the splitter and to reflect a given second one of said components, said phase change means being optically coupled to said first optical means via said beam splitter for receiving a one of said given light components and said output means being optically coupled to said first optical means via said beam splitter to receive a second one of said given components.

5. In the apparatus set forth in claim 4, further including, in combination:
said beam splitter having first and second orthogonally disposed output faces respectively for receiving and passing said passed and reflected light components;
said phase change means comprising a quarter-wave plate having a first surface affixed to one of said output faces and having an outer surface; and
a mirror disposed on said outer face of said quarter-wave plate.

6. In the apparatus set forth in claim 5, further including, in combination:
said photodetector being affixed to a second one of said output faces and the output path being inside the beam splitter leading to said photodetector.

7. In the apparatus as set forth in claim 3, further including, in combination:
said optical beam convertor means including a polarization responsive optical prism having an input surface and an oppositely facing first surface, an output surface extending orthogonally between said first surface and said input surface and a second surface extending between said first surface and said input surface and facing oppositely to said output surface;
said photodetector being mounted on said output surface for being in optical communication with said prism for receiving said intensity-modulated light beam, said photodetector having an electrical output connection means for carrying said modulated electrical signal;
first and second optical mirrors respectively mounted on said first and second surfaces for reflecting light received from the prism back into the prism; and
a quarter-wave plate optically interposed between a one of said mirrors and the oppositely facing surface of the prism to which the one mirror is mounted.

8. In the apparatus set forth in claim 7, further including, in combination:
second optical means in optical communication with said first optical means and including means for supplying a modulated light beam having S and P components for carrying information represented by said modulation; and
said second optical means including a magnetooptic record member having recorded information thereon and modulating the S and P components for representing the recorded information by rotating the S and P components.

9. In the apparatus set forth in claim 8, further including, in combination:
said photodetector having a single element photoresponsive element affixed to said output surface and a single transimpedance amplifier for amplifying said modulated electrical signal.

10. In the apparatus set forth in claim 3, further including, in combination:
said optical beam convertor means, including a polarization responsive beam splitter having an input surface, a facing output surface and a orthogonal output surface joining the input surface and the facing output surface and arranged such that one of the components leaves the beam splitter through said facing output surface and a second of the components leaves the beam splitter through said orthogonal output surface;
mirror means in optical communication with said output surfaces for redirecting light leaving said output surfaces along orthogonally intersecting light paths;
a half-wave plate in one of said intersecting light paths for rotating the component in the path to be light-phase aligned with the component in the other intersecting light path;
a neutral density light filter in the intersecting light path carrying the P component for changing the P component light density of the S component;
a plate beam splitter at the crossing of the intersecting light paths and disposed at 45° with respect thereto for combining said rotated component with the other component in two orthogonal diverging light paths for generating two intensity-modulated light beams by light interference between the combined components; and
said photodetector means including a photo-responsive element in each of said diverging light paths for detecting both of the intensity-modulated light beams.

11. In the apparatus set forth in claim 10, further including, in combination:
a differential electrical amplifier in the photodetector means and having two input portions respectively electrically connected to said photo-responsive elements and an output portion supplying said modulated electrical signal.

12. In the apparatus set forth in claim 10, further including, in combination:
a magnetooptical record member having information magnetically recorded therein;
second optical means in optical communication with the first optical means and said record member for focusing an unmodulated light beam on the record member and for directing the reflected light with the modulated P and S components representing the recorded information to said first optical means.

13. In a method of converting a light-phase modulated light beam having rotated S and P component light polarizations representing information to a modulated electrical signal carrying the same information: the steps of:
  converting the S and P component modulated light beam into an intensity-modulated light beam by combining the S and P components;
  photodetecting the intensity-modulated light beam; and
  producing said modulated electrical signal from the photodetecting.

14. In the method set forth in claim 13, further including, the steps of:
  in the converting step, rotating the polarization of one of the components to be polarized aligned with the other component; and
  combining the other component with the rotated component in a single light path to produce light interference for generating the intensity-modulated light beam.

15. In the method set forth in claim 13, further including: the steps of:
  in the converting step, splitting the two components to produce two light beams each carrying one of the components;
  directing the separate component light beams to intersect;
  at the intersecting, combining the component light beams and splitting the combined light beams into two separate combined light beams such that both the separate combined light beams experience light interference for producing two separate intensity-modulated light beams; and
  photodetecting both said separate intensity-modulated light beams for generating two modulated electrical signals, then combining the two modulated electrical signals using a differential amplifier to produce a single modulated output electrical signal.

* * * * *